United States Patent [19]

Frushour et al.

[11] 3,846,964

[45] Nov. 12, 1974

[54] PEANUT HARVESTING MACHINE
[75] Inventors: George Victor Frushour; Marvin Lee Nafziger, both of Albany, Ga.
[73] Assignee: Lilliston Corporation, Albany, Ga.
[22] Filed: Feb. 27, 1973
[21] Appl. No.: 336,202

[52] U.S. Cl. .................................. 56/16.6, 56/126
[51] Int. Cl. ............................................ A01d 41/10
[58] Field of Search ............................ 56/126–130, 56/16.6, 327, 330, 331, 354–357; 130/30 C; 214/43

[56] References Cited
UNITED STATES PATENTS
| | | | |
|---|---|---|---|
| 2,947,571 | 8/1960 | Hagen | 56/16.6 X |
| 3,306,018 | 2/1967 | Whitman | 56/126 |
| 3,529,408 | 9/1970 | Stark et al. | 56/16.6 X |

*Primary Examiner*—Louis G. Mancene
*Assistant Examiner*—J. N. Eskovitz
*Attorney, Agent, or Firm*—Newton, Hopkins & Ormsby

[57] ABSTRACT

A peanut harvesting machine includes a body having a gathering head and mechanism for separating peanuts from their vines. A collection box is mounted on top of the body and is provided with a bottom opening at one side of the body and with a door at the opposite side of the body. A blower having an upwardly extending chute in registry with the bottom opening of the collection box and upon which the collection box normally rests propels the separated peanuts into the interior of the collection box and a linkage system on the body operates to elevate the collection box and tip it to one side of the body for discharging the contents thereof into a wagon or the like alongside the machine and this linkage automatically opens the door of the collection box.

18 Claims, 6 Drawing Figures

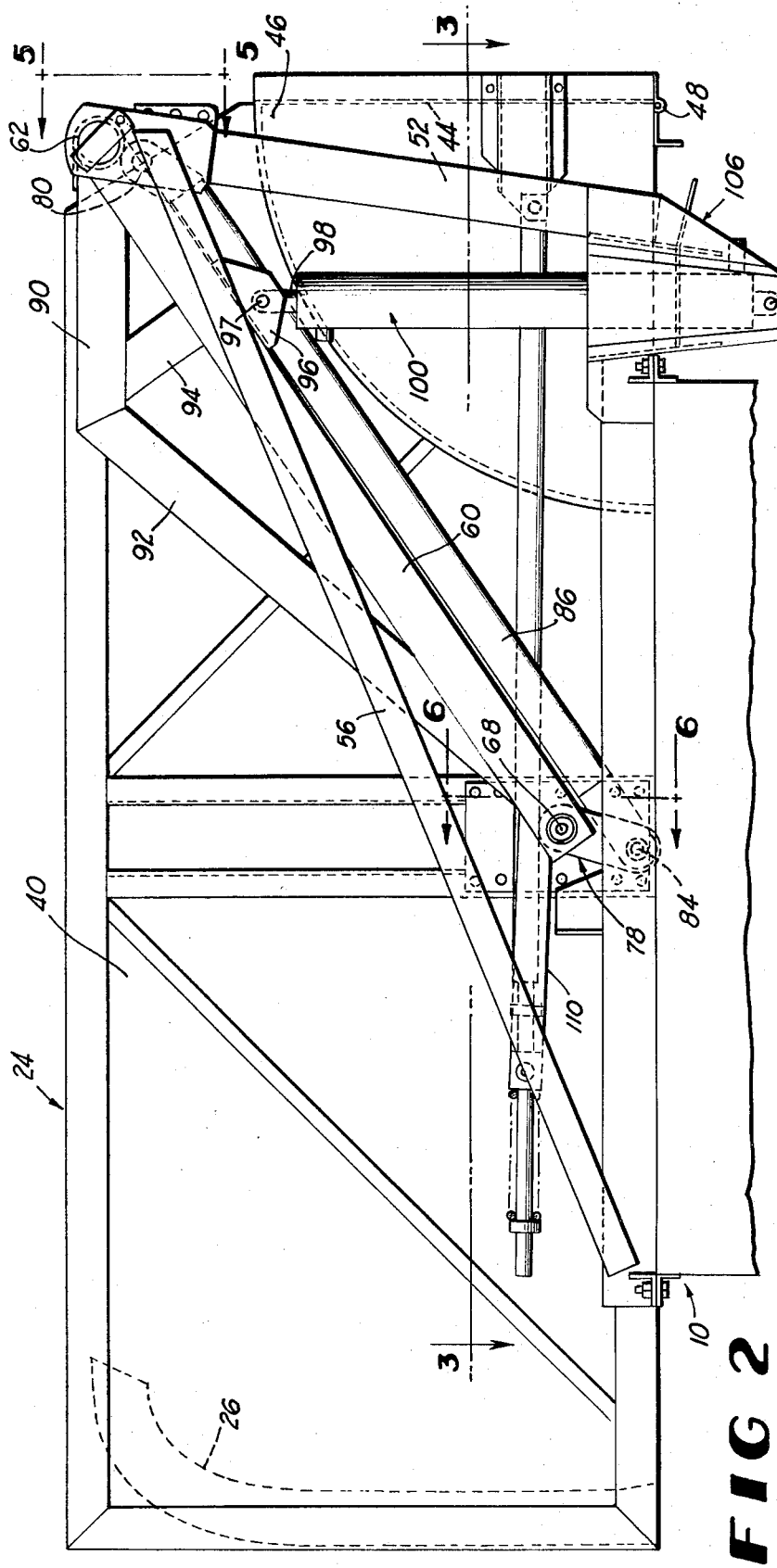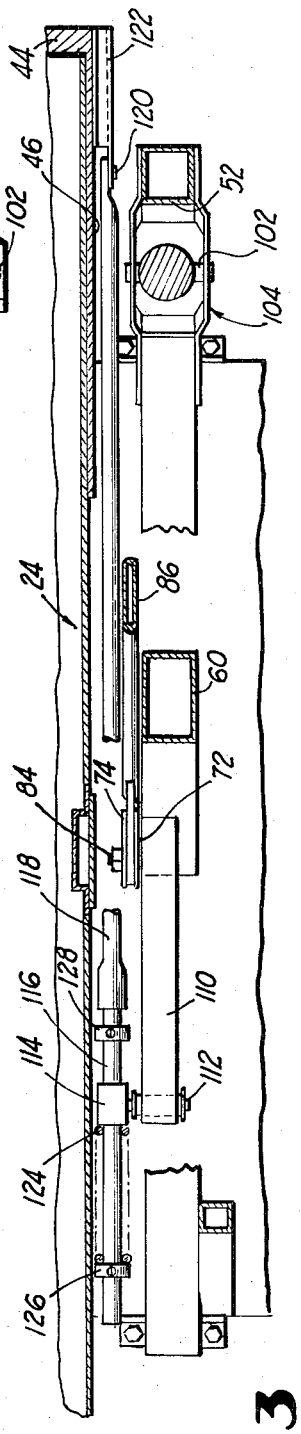

PEANUT HARVESTING MACHINE

CROSS REFERENCE TO RELATED APPLICATIONS

This application is related to the copending application of George V. Frushour et al. entitled Draft Tongue and Power Take-off Coupling for Peanut Combines, Ser. No. 331,638 filed Feb. 12, 1973, now U.S. Pat. No. 3,800,517; copending application of George V. Frushour et al., entitled Peanut Combine Collection Box and Filling System Therefor, Ser. No. 331,639 filed Feb. 12, 1973; and copending application of George V. Frushour et al., entitled Clevis Hitch Assembly, Ser. No. 331,636 filed Feb. 12, 1973 and the subject matters of these applications are incorporated herein by reference thereto.

BACKGROUND OF THE INVENTION

Peanut harvesters or combines tend to be rather bulky, cumbersome and unweildy machines and are at best difficult to maneuver and usually have a rather high center of gravity.

All of this makes it rather difficult to maneuver whereas, on the other hand, for economy, rapidity and ease of operation, it would be desirable if these machines were less cumbersome.

BRIEF SUMMARY OF THE INVENTION

It is therefore of primary concern in connection with the present invention to provide an improved form of peanut harvester or combine in which the machine is characterized by a rather low silhouette and center of gravity yet wherein the harvested peanuts may be discharged from a relatively high position disposed at one side of the machine so that a receptacle such as a wagon having high sides may be positioned along-side the harvester for receiving the discharged peanuts. To this end, the machine takes the form of a harvester body having a low silhouette and provided with the usual pick-up head for gathering in the peanut vines with the peanuts attached thereto and with conventional means for separating the peanuts from their vines. On top of this body there is mounted a collection box and operating means is provided for moving this collection box between a normal position in which it rests on top of the body to a discharging position wherein the box is elevated to a high position and tipped to one side of the harvester body.

The collection is provided with a bottom opening which, in the normal position of the collection box, rests upon and in registry with an upwardly facing chute through which the separated peanuts are discharged into the interior of the collection box. At the opposite side of the collection there is provided a door which normally is closed and forms the opposite side wall of the collection box. The operating means for elevating and tipping the collection box includes linkage connected to this door such that when the collection box is elevated and tipped to one side, the door is opened to hinge along its bottom edge into a position which is substantially coplanar with the bottom of the collection box thereby to form a discharge lip or spout for the peanuts being dumped from the box.

BRIEF DESCRIPTION OF THE DRAWING FIGURES

FIG. 2 is an elevational view showing the rear side of the collection box and the operating linkage therefor and illustrating also the upper extremity of the harvester body;

FIG. 3 is a horizontal section taken substantially along the plane of Section line 3—3 in FIG. 2 showing certain details of the linkage mechanism;

DETAILED DESCRIPTION OF THE INVENTION

Figure 1:
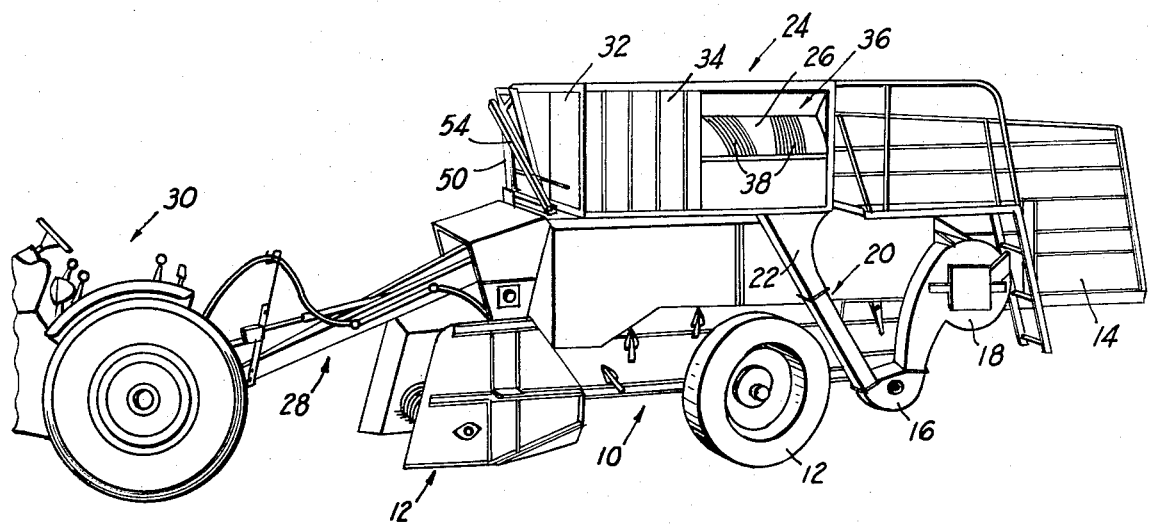
FIG. 1 is a perspective view showing a peanut harvester according to the present invention.

An illustrative embodiment of the invention is shown in FIG. 1 and the peanut combine shown therein will be seen to include a harvester body indicated generally by the reference character 10 provided with a pair of supporting wheels, one of which is indicated by the reference character 12, it being appreciated that a similar wheel is provided at the opposite side of the body. The harvester body includes a pick-up head mechanism indicated generally by the reference character 11 which is adapted to gather in the windrowed peanut vines with the peanuts attached thereto and to convey them into the interior of the harvester body 10 wherein conventional mechanism is utilized to separate the peanuts from the vines. The rear end of the body as indicated at 14 is provided with the usual discharge opening through which the peanut vines and other debris is discharged back onto the ground surface and the separated peanuts are diverted to the receiver section 16 with which the blower 18 cooperates to render the separated peanuts airborne and propel them upwardly through the chute indicated generally by the reference character 20. The flow-splitting section 22 of this chute faces upwardly and normally registers with a bottom opening in the peanut collection box which is indicated generally by the reference character 24. Interiorly of the collection box 24, there is provided a peanut diverting or spreading device as indicated by the dashed lines at 26 in FIG. 2 which causes the peanuts to flow properly into the collection box. The details of this mechanism and of the flow-splitting device 22 are disclosed in the copending application "Peanut Combine Collection Box and Filling System Therefor," specified hereinabove.

The bottom of the device 26 leads from the bottom opening of the collection box and normally registers with the upwardly facing opening of the flow-splitting device 22 as is clearly disclosed in the aforesaid copending application.

The forward end of the machine is provided with a draft tongue assembly indicated generally by the reference character 28, and the details of which are disclosed in the aforesaid copending application Ser. No. 331,638, filed Feb. 12, 1973, by means of which the combine assembly selectively is attached to a suitable towing vehicle such as a tractor 30 as illustrated.

The collection box is of generally rectangular configuration and includes the front wall 32, the side wall 34 provided at its rear side with the opening 36 through which an upper portion of the device 26 may be seen in FIG. 1, it being noted from FIG. 1 that the device 26 is provided with register or comb sections 38 through which air may escape for discharge through the opening 36, all as is described in conjunction with the aforesaid copending application directed to the details of the collection box.

The rear wall of the collection box is indicated by the reference character 40 in FIG. 2 and it will also be seen in FIG. 2 that the collection box 24 overhangs the body 10 at either side thereof.

Figure 4:
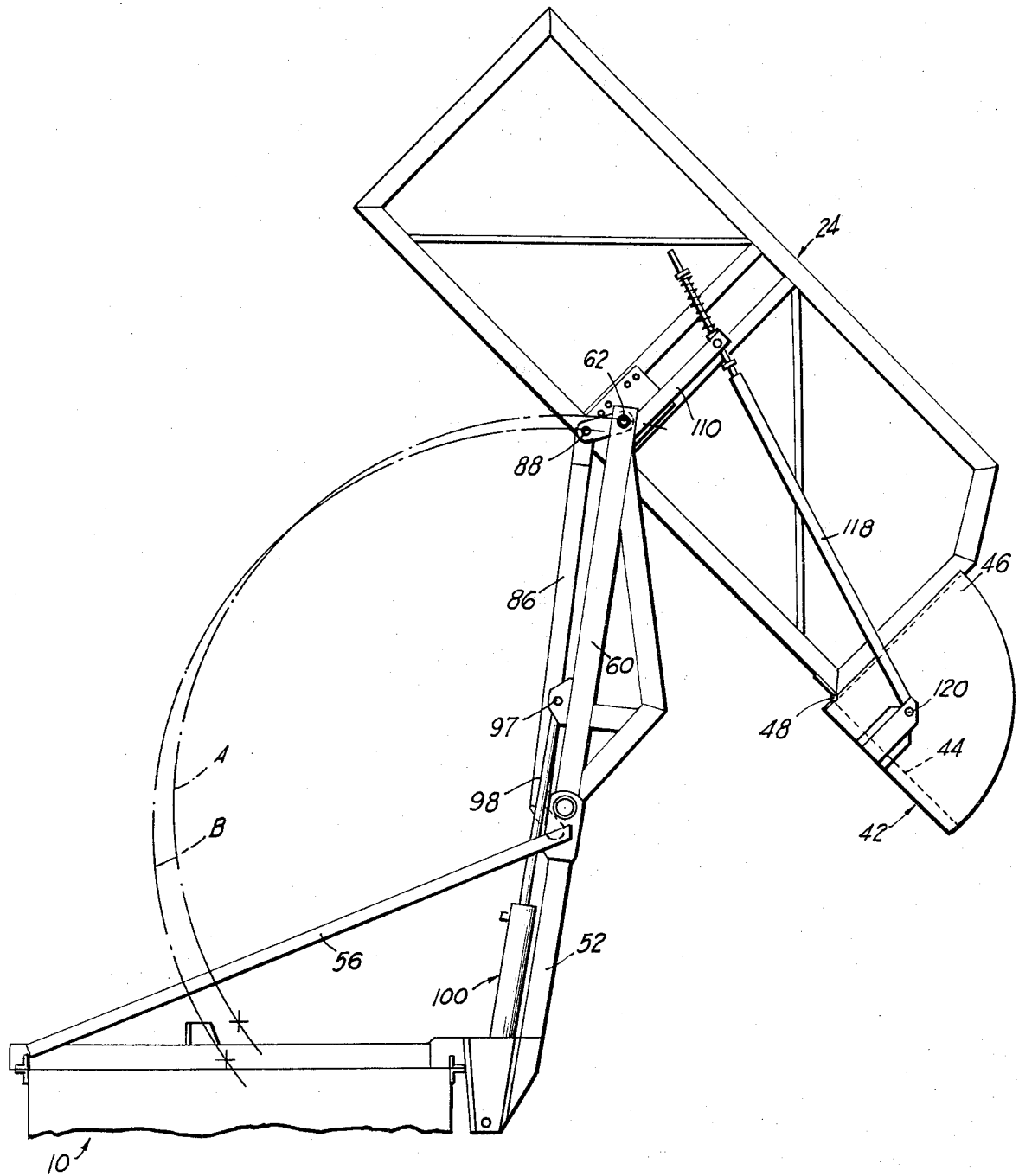
FIG. 4 is a view similar to FIG. 2 but showing the collection box in the elevated, dumping position.

Mechanism to be described presently is operative to move the collection box 24 between the position shown in FIG. 2 which is the normal position thereof to the discharging position as is illustrated in FIG. 4. As will be clearly evident from FIG. 4, the collection box is provided with a door indicated generally by the reference character 42 which is in the form of a plate portion 44 normally closing that side of the collection box 24 which is at the right in FIG. 2 and which is on the off side with relation to FIG. 1, the door including vertical side panels such as the panel 46 so that when it is in the position shown in FIG. 4, the plate portion 44 of the door is essentially an extension of the bottom of the collection box 24 and the side plates 46 are operative to prevent spillage of the peanuts and to funnel them for discharge over the free edge of the plate portion 44 into a receptacle such as a high-sided wagon disposed alongside of the harvesting machine. The door assembly 42 is provided with a bottom edge hinge as indicated by the reference character 48 and from FIG. 2 it will be clear that when the collection is in its normal position, the door is in position to close the corresponding side of the collection box.

The operating mechanism which functions to elevate the collection box 24 to a high position and to tip it to one side of the harvesting machine body 10 as is clearly shown in FIG. 4, takes the form of linkage mechanism mounted upon the uprights 50 and 52 which are disposed respectively at the forward and rear sides of the collection box, the upright 50 being illustrated in FIG. 1 and the upright 52 being evident in FIGS. 2 and 4. These uprights are provided with stays or braces 54 and 56 which extend from the upper ends of the respective uprights diagonally downwardly and are attached at their opposite ends to the opposite side at the top of the body 10, as is clearly shown. These braces or stays are merely for the purpose of providing rigidity for the respective uprights.

Figure 5:
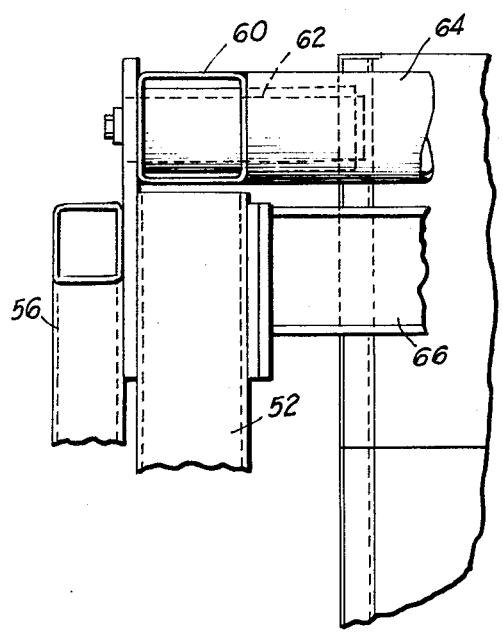
FIG. 5 is an enlarged elevational view taken substantially along the plane of Section line 5—5 in FIG. 2.

Each upright pivotally mounts one end of a main arm member 60, the pivotal connection being at the stub axle or journal 62, one of which is rotatably received in each of the fore and aft extending connecting tube 64 as is shown in FIG. 5. The main arms 60 are welded or otherwise rigidly affixed to the opposite ends of the tube 64 and the upper ends of the uprights 50 and 52 are rigidly interconnected by the fore and aft extending brace 66 as is shown in FIG. 5.

Figure 6:
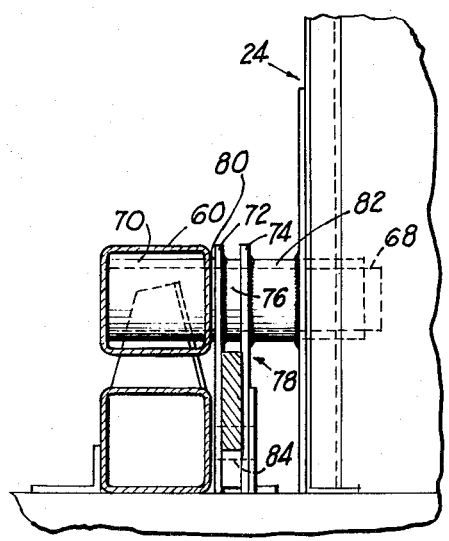
FIG. 6 is a vertical section on enlarged scale taken substantially along the plane of Section line 6—6 in FIG. 2.

The opposite ends of the arms 60 are pivotally connected to journal pins 68 fixed to the respective front and rear walls of the collection box 24 as may be seen in FIG. 6 and these stub or journal shafts 68 project within bushings 70 in the respective main arms 60. A pair of plate members 72 and 74 are rigidly interconnected by a bushing member 76 to form a link indicated at 78 in FIG. 2 which is also journaled on its respective shaft 68 separately from the main arm 60, it being appreciated that a thrust washer 80 may be interposed between the link and the main arm 60 as is shown in FIG. 6. A spacer bushing 82 is a continuous element and extends through members 74 and 72, and terminates at the juncture with the thrust washer 80.

The link 78 in each case is free to swing about the axis of the pin 68 and is pivotally connected by a suitable pin 84 carried between the plates 72 and 74 to one end of the motion transmitting arm 86 associated with each of the main arms 60. The opposite end of each motion transmitting arm 86 is pivotally connected by means of a suitable pin 88 to the upper end of its respective upright 50 or 52 as will be evident from FIG. 2. Each main arm 60 may be provided with a truss-like rigidifying framework such as is indicated by the frame pieces 90, 92 and 94 in FIGS. 2 and 4 and each arm is also provided with a suitable bracket 96 to which the piston rod 98 of an hydraulic piston and cylinder assembly 100 is pivotally attached, the lower extremity of each hydraulic cylinder and piston assembly being pivotally connected as by a pin 102 within the well indicated generally by the reference character 104 formed as part of the base 106 by means of which the lower end of each upright 50 or 52 is rigidly secured to its corresponding side of the harvester body 10.

The main arm 60 in each case is provided with an extension member 110 which serves the function of opening and closing the door of the collection box. This extension member in each case carries, by means of a pin 112, a slide member 114 which slidably receives the cylindrical rod portion 116 of the corresponding door controlling link 118. The link 118 is pivotally secured as at 120 at its end to a suitable bracket 122 on the corresponding door panel 46 and the opposite end thereof slidably receives the member 114 as indicated clearly in FIG. 3. The slide member 114 bears against a compression spring 124 interposed between the slider 114 and a stop collar 126 which is adjustably located on the rod section 116 thereby to preload the door into closed position as will be evident. A further stop collar 128 is adjustably mounted on each rod portion 116 and serves to limit the open position of the door as will be evident from FIG. 4. Preferably, the door, as is shown in FIG. 4, ends up as a spout for the collection box with the panel portion 44 of the door disposed substantially as a continuation of the bottom wall of the collection box 24, as will be evident.

As noted hereinbefore, the main arms 60 are operated by the hydraulic cylinder and piston assemblies 100 from the position shown in FIG. 2 to the elevated position shown in FIG. 4. The arms 60 are pivotally secured to the corresponding rear and forward sides of the collection box 24 and pivot about the uprights 50 and 52 as shown by the arc A in FIG. 4 whereas the pivotal connections between the controlling arms 78 and the links 86 swing about the arcs B as indicated in FIG. 4. These arc intersect and cross over each other as is shown with the net result that the collection box remains in a substantially horizontal position during most of its travel from the normal to the discharging positions and it is only during the latter stage of this movement that the box begins to tip over as is indicated in FIG. 4 while, simultaneously, the door is constrained to move largely by gravity to the final open position thereof as is indicated in FIG. 4.

What is claimed is:

1. A peanut harvesting maching comprising, in combination:

a harvester body including pick-up head means for gathering in peanut vines with peanuts attached and means for separating peanuts from their vines;

support wheels for said harvester body;

a peanut collection box mounted on top of said body and having a bottom opening at one side thereof;

means for discharging separated peanuts upwardly into said collection box through said bottom opening;

means for elevating said collection box and tipping it to that other side of said body opposite said one side of the collection box to discharge the contents thereof into a receptacle alongside said machine, and including an upright assembly at said other side of the machine, arms pivotally connected to said upright assembly fore and aft of said box and extending transversely downwardly therefrom into pivotal connection with the bottom portion of said box essentially midway between the opposite sides thereof, extensible means connecting said body to said arms for swinging said arms about their pivotal connections to said upright assembly bodily to lift said box to a position above said upright assembly, and linkage means interconnecting said box to said upright assembly for maintaining said box essentially level as it moves to said position above the upright assembly and then to tilt said box downwardly toward said other side of the body; and a door normally closing that other side of said collection box at said other side of said machine, said door being provided with a hinge along the bottom edge thereof, at least one of said arms having an extension projecting from its pivotal connection with said collection box, and linkage means connecting said extension to said door for closing said door positively when the collection box is in lowered position and for allowing said door to swing downwardly into position in which it forms a continuation of the bottom of the box when the latter is tipped.

2. A peanut harvesting machine comprising, in combination:

a harvester body including pick-up head means for gathering in peanut vines with peanuts attached and means for separating peanuts from their vines;

support wheels for said harvester body;

a peanut collection box mounted on top of said body and having a bottom opening at one side of said body and a door forming a side wall of the collection box at the opposite side of said body;

means including an upwardly facing chute registered with said bottom opening for discharging separated peanuts into the interior of said collection box; and means for elevating said collection box and tipping it to said opposite side of said body to discharge the contents thereof into a receptacle alongside said machine.

3. A peanut harvesting machine as defined in claim 2 wherein said collection box overhangs said harvester body at either side thereof, said bottom opening being disposed beyond one side of said harvester body.

4. In a peanut harvesting machine, in combination:

a harvester body having a delivery chute for separated peanuts at one side thereof;

a peanut collection box normally resting on top of said body and having a bottom opening disposed in registry with said delivery chute;

means for elevating said collection box and tipping it to that side of the harvesting body opposite from said discharge chute;

said collection box including a door normally closing the box at said opposite side of the harvester body; and the means last mentioned including linkage operable to open said door when the collection box is tipped.

5. In a peanut harvester as defined in claim 4 wherein said last mentioned means includes a pair of main arms pivotally connected to the fore and aft sides of said collection box and a pair of motion-control arms link-connected to said main arms.

6. In a peanut harvester as defined in claim 5 wherein said body includes an upright assembly along that side thereof opposite said discharge chute, said main arms being pivotally connected to said upright assembly and extending transversely downwardly therefrom into pivotal connection with the bottom position of said collection box essentially midway between the opposite sides thereof, extensible power means connected between said body and said main arms for swinging said main arms upwardly to position said collection box above said upright assembly, and auxiliary linkage means connecting said upright assembly to said collection box for maintaining the collection box essentially level until it approaches its position above the upright assembly and then tipping it downwardly to said opposite side of the harvester body.

7. In a peanut harvester as defined in claim 6 wherein at least one of said main arms is provided with an extension offset from the pivotal connection thereof with said collection box, and control linkage means connecting said extension to said door for positively closing said door when the collection box is in lowered position.

8. In a peanut harvester as defined in claim 7 wherein said door is hinged along its bottom edge to the bottom of said collection box and said control linkage means allows said door to swing downwardly into position in which it forms a continuation of the bottom of the box when the latter is tipped.

9. A peanut harvester characterized by low silhouette and ease of offloading harvested peanuts therefrom, comprising in combination:

a harvester body including pick-up head means at the forward end thereof for gathering in peanut vines with peanuts attached, means within said body and located behind said pick-up head means for separating peanuts from their vines said diverting them to a region rearwardly of and to one side of said body, blower means for conveying peanuts from said region and including a discharge chute extending upwardly from said region to terminate in a discharge mouth located to said one side of the body and at a generally centralized location with respect to the fore and aft ends of said body;

a peanut collection box resting upon said body and having a bottom opening registering with said discharge mouth, said collection box being closed to prevent escape of peanuts therefrom so that peanuts discharged through said chute enter and are trapped within said box; and power operated means disposed at that other side of the body opposite said one side thereof for selectively elevating said collection box from its rest position while in essentially level condition to a position to said other side of the body whereat the collection box is also tipped downwardly to discharge its contents, said closed collection box including a hinged side wall door at said other side of the body which swings open to allow said discharge of the contents.

10. In a peanut harvester as defined in claim 9 wherein said region whereto separated peanuts are diverted, said blower means and said delivery chute are all located outside said body at said one side thereof, said collection box overhanging said body when resting thereon at least to said one side of the body whereby effectively to register its bottom opening with said discharge mouth of the discharge chute.

11. In a peanut harvester as defined in claim 10 wherein said closed collection box is provided internally thereof with a discharge hood leading upwardly from said bottom opening, said hood including air discharge openings leading externally of said box and sized to prevent escape of peanuts therethrough.

12. In a peanut harvester as defined in claim 9 wherein said closed collection box is provided internally thereof with a discharge hood leading upwardly from said bottom opening, said hood including air discharge openings leading externally of said box and sized to prevent escape of peanuts therethrough.

13. In a peanut harvester as defined in claim 9 wherein said support wheels are disposed beneath said collection box.

14. In a peanut harvester as defined in claim 9 wherein said power operated means includes a pair of main arms pivotally connected to said upright assembly fore and aft of said collection box and extending transversely downwardly therefrom into pivotal connection with the bottom portion of said collection box essentially midway between the opposite sides thereof, extensible means connecting said body and said arms for swinging said arms about their pivotal connections to the upright assembly bodily to lift said collection box to a position above said upright assembly, and linkage means interconnecting said collection box to said upright assembly for maintaining said box essentially level until it reaches substantially its terminal position and then to tilt said box downwardly toward said other side of the body.

15. In a peanut harvester as defined in claim 14 wherein said door is provided with a hinge along the bottom edge thereof, at least one of said arms having an extension projecting from its pivotal connection with said collection box, and linkage means connecting said extension to said door for closing said door positively when the collection box is in lowered position and for allowing said door to swing downwardly into position in which it forms a continuation of the bottom of the box when the latter is tipped.

16. In a peanut harvester as defined in claim 15 wherein said region whereto separated peanuts are diverted, said blower means and said delivery chute are all located outside said body at said one side thereof, said collection box overhanging said body when resting thereon at least to said one side of the body whereby effectively to register its bottom opening with said discharge mouth of the discharge chute.

17. In a peanut harvester as defined in claim 16 wherein said closed collection box is provided internally thereof with a discharge hood leading upwardly from said bottom opening, said hood including air discharge openings leading externally of said box and sized to prevent escape of peanuts therethrough.

18. In a peanut harvester as defined in claim 15 wherein said closed collection box is provided internally thereof with a discharge hood leading upwardly from said bottom opening, said hood including air discharge openings leading externally of said box and sized to prevent escape of peanuts therethrough.

* * * * *